(12) United States Patent
Takahashi

(10) Patent No.: US 6,918,593 B2
(45) Date of Patent: Jul. 19, 2005

(54) MECHANICAL SEAL DEVICE

(75) Inventor: Hidekazu Takahashi, Saitama (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/747,215

(22) Filed: Dec. 30, 2003

(65) Prior Publication Data

US 2004/0150166 A1 Aug. 5, 2004

(30) Foreign Application Priority Data

Jan. 24, 2003 (JP) ........................................ 2003-016723

(51) Int. Cl.[7] ................................................ F16J 15/34
(52) U.S. Cl. ........................ 277/389; 277/390; 277/391; 277/392
(58) Field of Search ................................ 277/389, 390, 277/391, 392

(56) References Cited

U.S. PATENT DOCUMENTS

| 4,558,872 A | * | 12/1985 | Vossieck et al. | ............ 277/379 |
| 4,936,593 A | * | 6/1990 | Finney | ........................ 277/391 |
| 5,199,720 A | * | 4/1993 | Radosav et al. | ............ 277/370 |

* cited by examiner

Primary Examiner—Enoch Peavey
(74) Attorney, Agent, or Firm—Arent Fox PLLC

(57) ABSTRACT

A primary technical goal of the present invention is to provide a mechanical seal device in which a manufacturing cost of the parts is decreased, a satisfactory seal performance is exhibited even under severe operating conditions, and the device can be easily mounted outside relative to the housing. The mechanical seal device comprises a first diaphragm, a stationary seal ring, a rotary seal ring, a second diaphragm and a fluid passage which guides a sealed process fluid to the respective pressure receiving grooves of the first diaphragm and the second diaphragm wherein the first diaphragm retains a fixing section which is fixed relative to the mounting portion of a seal cover, a retaining section and a first pressure receiving face, the stationary seal ring retains a seal face which is retained by the retaining section, the rotary seal ring retains an opposing seal face which stays in a sealing contact with the seal face, and the second diaphragm is shaped and dimensioned in more or less an identical manner relative to the first diaphragm and retains a retaining section, a fixing section and a second pressure receiving face thereon.

9 Claims, 3 Drawing Sheets

MECHANICAL SEAL DEVICE

BACKGROUND OF THE INVENTION

1. Field of the Invention

The present invention relates generally to a mechanical seal device. More particularly, the invention relates to a mechanical seal device disposed at the end portion of a housing of large pumps, agitators or the like which provides a seal against a sealed process fluid between the housing and a rotary shaft whose pressure ranges from a low pressure to a high pressure.

2. Description of the Related Art

There has been a mechanical seal device for a high pressure pump as a relative art of the present invention, for example being disclosed in U.S. Pat. No. 5,114,163. However, this mechanical seal device is likely to impose a higher cost for individual seal elements as they require relatively large dimensions. This is a first problem which needs improvement. In addition, the seal device is so constructed that a rotary seal ring and a stationary seal ring receive the pressure from the sealed process fluid in the same direction. Therefore, when the fluid pressure is increased, a high pressure is exerted in the same direction to both the rotary seal ring and the stationary seal ring. Under this circumstance, if an excessive pressure is exerted by the sealed fluid against the rotary seal ring, there is a chance that the rotary seal face departs from the mating stationary seal face, which will cause a breakage of a sealing contact. This is a second problem to be solved. There remains another problem yet to be resolved. That is, the rotary seal ring is fixed relative to the rotary shaft while the stationary seal ring is fitted to the housing. Therefore, a thermal expansion of the rotary shaft not only may hamper a sealing contact between the stationary seal face and the rotary seal face but also is likely to cause unwanted eccentricity.

FIG. 3 represents a mechanical seal device 200 as an example of the above mentioned relative art, which will be described in details below. The mechanical seal 200 in FIG. 3 is formed and dimensioned in a large size due to its deployment over a rotary shaft 148 which itself is large in diameter, which leads to a heavy weight of the entire seal assembly. Therefore, the mechanical seal device is typically divided into two split parts so that deployment of the seal device to the rotary shaft 148 is simplified.

This split-type mechanical seal 200 provides a seal against the sealed process fluid between a housing 150 and the rotary shaft 148 at a pair of mating seal faces, i.e., a stationary seal face 161 of a stationary seal ring 160 and a rotary seal face 171 of a rotary seal ring 170, whether the seal faces are subject to a relative sliding motion or remain stationary.

There is a clearance between an inner surface of the stationary seal ring 160 and the rotary shaft 148 through which the sealed process fluid reaches a second gland 175 which is located closer to the rotary seal ring 170.

A first gland 165 has a thick annular structure whose half cross section is shaped like an alphabet character L. An outer diameter surface of the stationary seal ring 160 is securely fitted with an inner diameter surface 167 of a cylindrically extending portion of the first gland 165. A flange section 166 which is disposed at the other end of the cylindrically extending portion of the first gland 165 makes a sealing contact with the end surface of the housing 150.

The first gland 165 is fixed to the inner diameter surface of the split stationary holder 168 which consists of two split pieces. The other end portion of the split stationary holder 168 is fixedly mounted on a protruding portion which is located at one end of the housing 150.

The split stationary holder 168 fixedly retains the stationary seal ring 160 with the first gland 165 being disposed therebetween. The stationary seal ring 160 and the first gland 165 are retained within the split stationary holder 168 and are fixated by means of clamping screw bolts 153, 153.

As the first gland 165 covers the entire inner surface of the split stationary holder 168, a flange section 166 of the gland between the stationary seal ring 160 and the housing 150 is made to have a thick wall so as to sustain a high pressure. Therefore, the first gland 165 tends to be large in size and heavy in weight. In addition, a forming die for the first gland 165 incurs a high manufacturing cost. These are problems to be resolved.

The rotary seal ring 170 forms a loose fit relative to the rotary shaft 148 with a clearance therebetween and the rotary seal face 171 makes a sealing contact with the stationary seal face 161 for providing a fluid tight seal against the sealed fluid even under a relative sliding movement. Outer diameter surface of the rotary seal ring 170 is fitted to an inner diameter surface 177 of the second gland 175. Also the rotary seal ring 170 is securely fixed to the split rotary holder 178 via the second gland 175. As this second gland 175 is large in diameter, a forming die for it results in a high manufacturing cost. Furthermore, different forms of the first gland 165 and the second gland 175 necessitate use of different forming dies, which even further increases the total manufacturing cost. This is another problem yet to be accommodated.

Split rotary holder 178 is fixed to the rotary shaft 148 by means of a key which does not appear in the figure. The split rotary holder 178 is assembled as an integral unit by fastening a couple of screw bolts 154, 154 at a pair of mating surfaces. Therefore, the large-in-diameter cylindrical portion of the second gland 175 provides a seal between the rotary seal ring 170 and the inner surface of the split rotary holder 178. Likewise, a small-in-diameter cylindrical portion of the second gland 175 provides a seal between the rotary shaft 148 and the split rotary holder 178. These two cylindrical portions both of which are shaped in a thick wall make it difficult to achieve a sensitive pressure control at the mating faces even with the screw bolts being tightly fastened, which is prone to a leakage of the sealed process fluid. This presents another problem to be remedied.

The second gland 175 thus formed makes the split rotary holder 178 heavy as well. Rotating the split rotary holder 178 with the rotary shaft 148 tends to cause an eccentricity of the rotary shaft 148, and such an eccentricity in turn causes abrasions of the rotary seal face 171 of the rotary seal ring 170 as well as of the stationary seal face 161 of the stationary seal ring 160. This imposes a further problem.

In a mechanical seal device thus constructed, the flange portion 166 of the first gland 165 located between the split stationary holder 168 and the end face of the housing 150 is necessarily shaped in a thick wall so as to achieve a seal contact at the stationary seal face 161 and the rotary seal face 171, and so is the radially extending portion of the second gland 175. This is another problem to be improved.

The stationary seal ring 160 is fixated relative to the housing 150 via the split stationary holder 168 while the rotary seal ring 170 is fixedly secured to the rotary shaft 148 via the split rotary holder 178. If the rotary shaft 148 is subject to a thermal expansion in its outward and axial direction, the seal contact between the stationary seal face 161 and the rotary seal face 171 is disturbed. This creates another problem to be solved.

The present invention is introduced to resolve the above mentioned problems. A primary technical goal which this invention tries to achieve is to improve a seal performance of a mechanical seal device such that a pair of seal faces which are mutually in contact are able to maintain a fluid tight seal even under a great pressure or varying pressure of a sealed process fluid.

Another goal is to fixate a rotary seal ring relative to a rotary shaft by integrating with a diaphragm in the outside of a housing such that a good seal performance is exhibited even under a great pressure or varying pressure of a sealed process fluid or when the rotary shaft is bent.

Yet another goal is to decrease the manufacturing cost of parts involved in the mechanical seal device, to simplify assembly of the parts, and to reduce the total manufacturing cost of the mechanical seal device as a whole.

SUMMARY OF THE INVENTION

A primary object of the present invention is to resolve the above mentioned technical problems, and a solution to such problems is embodied as follows.

A preferred embodiment of a mechanical seal device constructed in accordance with the principles of the present invention is a mechanical seal device to provide a seal against a sealed process fluid under a variable pressure ranging from a low pressure to a high pressure. The mechanical seal device comprises a seal cover being disposed at the end face of a housing and retaining a mounting face, a first diaphragm being of an annular form and retaining a fixing section and a retaining section, the fixing section being mounted on the mounting face of the seal cover, the retaining section being located on the opposite side relative to the fixing section, a stationary seal ring being sealingly retained by the retaining section of the first diaphragm and having a seal face at one end, a rotary seal ring having an opposing seal face, the opposing seal face being in a sealing contact relative to the seal face of the stationary seal ring, a second diaphragm being of an annular form and being shaped and dimensioned in more or less an identical manner relative to the first diaphragm and retaining a retaining section and a fixing section, the fixing section being connected with a rotary shaft, a first pressure receiving groove being disposed between the fixing section and the retaining section of the first diaphragm, a second pressure receiving groove being disposed between the fixing section and the retaining section of the second diaphragm, and a fluid passage guiding the sealed process fluid into the first pressure receiving groove and the second pressure receiving groove.

In the mechanical seal device relative to the present invention, the first diaphragm and the second diaphragm which are shaped and dimensioned in more or less an identical manner relative to one another can be manufactured by using a common forming die. Therefore, there is no need of having two different forming dies which typically cost about five to ten millions Japanese yen per piece, which decreases the manufacturing cost of the first diaphragm and the second diaphragm.

Also since the stationary seal ring and the rotary seal ring are resiliently supported, respectively, by the first diaphragm and the second diaphragm, the first diaphragm and the second diaphragm exhibit an elastic deformation according to the rotary shaft deformation caused by the following reasons; the rotary shaft becomes eccentric during its rotation, a friction heat causes a thermal expansion of the rotary shaft, or a shaft bending is caused by its self-weight. Even under an occurrence of such an elastic deformation, the seal face of the stationary seal ring and the opposing seal face of the rotary seal ring retain a fluid tight sealing contact because the sealed process fluid acts on the first pressure receiving face and the second pressure receiving face with an equal amount of pressure. Therefore, a seal performance of the seal faces of the mechanical seal device can be ensured.

The fluid pressure acting on the pressure receiving grooves of the first diaphragm and the second diaphragm wherein both diaphragms have an identical form is applied to the grooves of an equal pressure receiving area. Therefore, the stationary seal ring and the rotary seal ring are urged with approximately an equal amount of force by the sealed process fluid. The same amount of urging force by which the seal face of the stationary seal ring and the opposing seal face of the rotary seal ring are pressed against one another prevents an uneven wear of the seal faces.

The first diaphragm resiliently supports the stationary seal ring while the second diaphragm resiliently supports the rotary seal ring wherein both rings are urged against one another to achieve a sealing contact. Such a mechanical seal device has an easy assembly construction and can easily be mounted on the outer part of the housing.

DETAILED DESCRIPTION OF THE INVENTION

Described below is the details of the figures of a preferred embodiment of a mechanical seal device constructed in accordance with the principles of the present invention. All the figures explained below are constructed according to actual design drawings with accurate dimensional relations.

Figure 1:
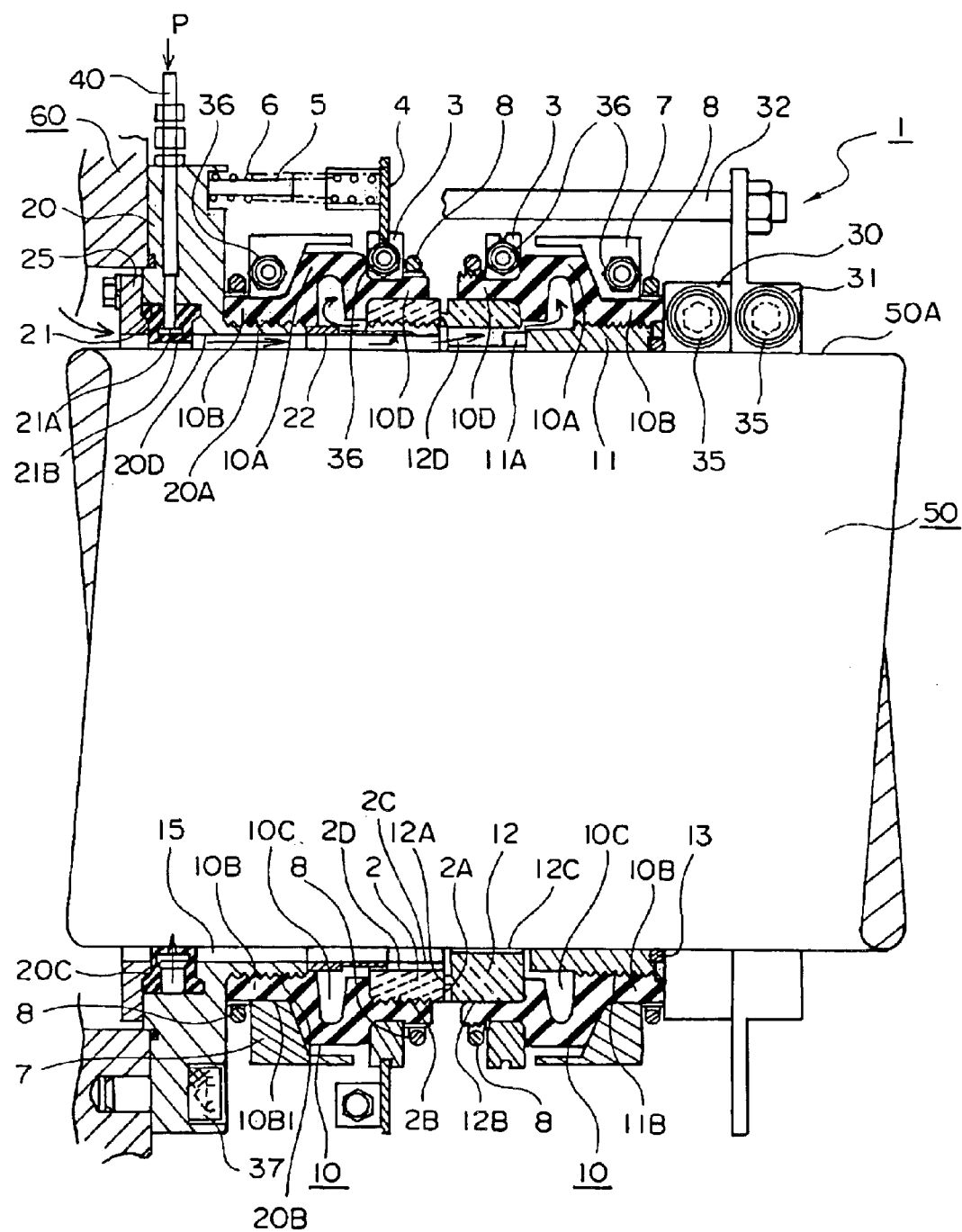
FIG. 1 is a cross sectional view of a mechanical seal device as a first embodiment related to the present invention.

FIG. 1 depicts a cross sectional view of a mechanical seal device 1 representing a first embodiment relative to the present invention.

Figure 2:
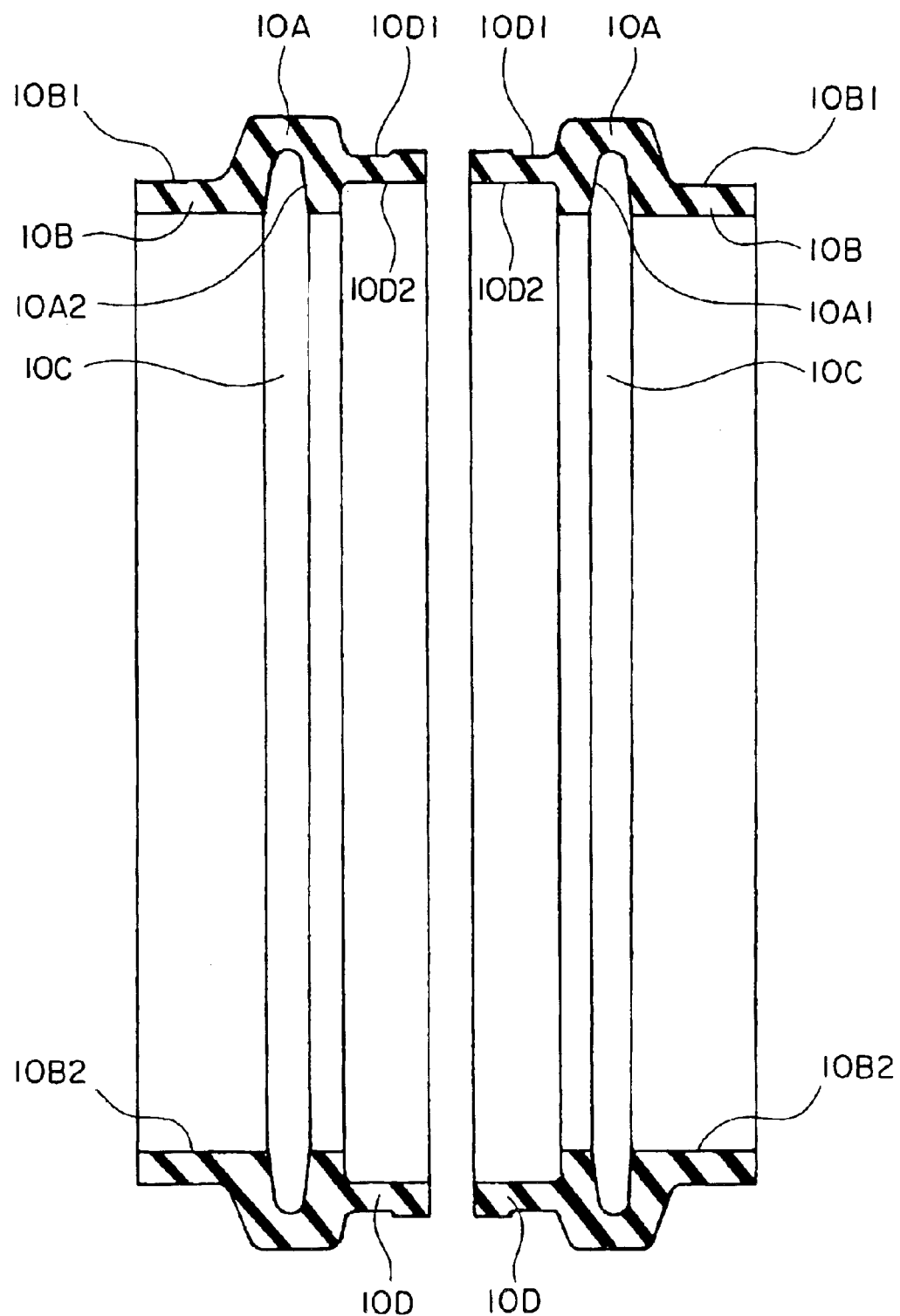
FIG. 2 is a cross sectional view of a pair of a first diaphragm and a second diaphragm relative to the present invention which are arranged in symmetric positions.
Figure 3:
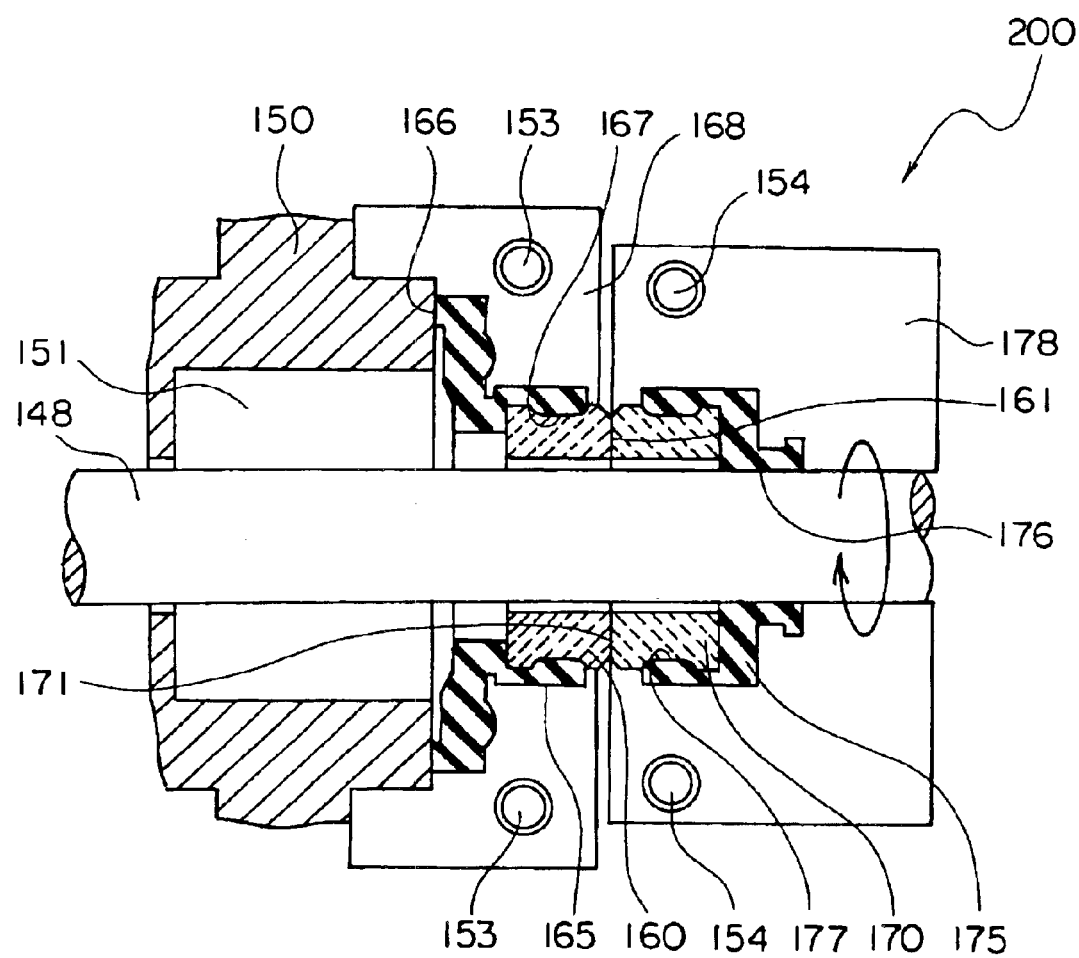
FIG. 3 is a half cut-away sectional view of a mechanical seal device as a relative art of the present invention.

In FIG. 1 and FIG. 2, 1 signifies a mechanical seal device. This mechanical seal device 1 is intended to provide a seal on the outer part of a housing 60 of a pump or the like against a sealed process fluid which is located between the internal of the housing 60 and a rotary shaft 50 being fitted within the housing 60.

End face of the housing 60 mounts a seal cover 20 which is secured therein by means of screw bolts 37. The seal cover 20 retains an inner diameter surface 20D to which a rotary shaft 50 loosely fits with a clearance being located therebetween. The seal cover 20 also has a cylindrical mount section 20A which protrudes relative to the end face of the cover. Mount surface 20B which is defined in the outer diameter surface of the mount section 20A disposes an engaging thread which consists of small continuous irregularities. The mount surface 20B of the engaging thread not only provides a sealing contact for avoiding a leakage of the sealed fluid when a first diaphragm 1 is fitted on but also prevents the first diaphragm 10 thus fitted from coming off.

Inner diameter surface of the seal cover 20 retains an annular step shoulder. An annular groove 20C is disposed between the step shoulder and a side plate 25 which is located beside the side wall of the seal cover 20 wherein the groove 20C is used to dispose a throttle valve 21.

Furthermore, a through hole is disposed in the annular groove 20C wherein a pipe 40 is fitted to the through hole. Rubber-made, wheel shaped throttle valve 21 which is installed in the annular groove 20C is connected with the pipe 40 so that a compressed fluid P can communicate between the two. The pipe 40 is located on the outer diameter surface of the seal cover 20 in a bisectional manner although three, four or five may be disposed in an equally spaced manner depending on design specifications.

The throttle valve 21 retains an expansion chamber 21A therewithin, and a compressed fluid P fed through the pipe 40 induces the expansion chamber 21A to expand and, as a result, a throttle face 21B moves closer relative to the diameter surface of the rotary shaft 50. Reducing the sealed process fluid by means of the expansion of the throttle face 21B located in the inner circumferential side of the throttle valve 21 achieves to decrease a pressure exerted on the first diaphragm 10 and on the second diaphragm 10 due to the sealed process fluid.

Upstream of the pipe 40 communicates a fluid compressor which is not shown in the figure, and a controller which is also omitted computes an appropriate valve action according to the correlation data obtained in advance between the pressure of the sealed process fluid and other factors such as material strength of the rubber-made first diaphragm 10 and the second diaphragm 10 and pressure receiving areas of a first pressure receiving face 10A2 and a second pressure receiving face 10A1. The controller modulates a flow volume of the sealed fluid flowing within the inner surface of the throttle face 21B by means of a proper action of the throttle valve 21 thus computed accordingly. Modulation of the fluid pressure by the throttle valve 21 attains an optimized control with respect to an expansion ratio of the first diaphragm 10 and the second diaphragm 10 as well as a contact degree of a seal face 2A relative to its mating seal face 12A.

FIG. 2 is referred to next. The first diaphragm 10 installed in the mount section 20A of the seal cover 20 is molded by using a forming die. Material such as NBR, EPDM, CR, FVMQ, rubber-like resin or the like is used so that the first diaphragm 10 retains a first pressure receiving area 10A2 for the sealed process fluid. In case that the circumferential radius of the mold surface of the forming die becomes large, e.g., more than several tens of centimeters, the first diaphragm 10 may be split into two semicircular halves for the purpose of a reduced cost of the forming die or an ease of assembly of the first diaphragm 10 relative to the rotary shaft 50. The first diaphragm 10 consisting of the split halves is shaped in a continuous ring form by means of a cure bonding applied at the end surfaces of the split halves during the molding process. Adoption of this type of forming die leads to a low manufacturing cost.

One end of the first diaphragm 10 defines a fixing section 10B which engages the mount section 20A of the seal cover 20. The outer diameter surface of the fixing section 10B defines a fixing surface 10B1 which is fastened by a first hose band 8. Also the inner diameter surface of the fixing section 10B serves as a mount fixing face 10B2 (refer to FIG. 2).

As shown in FIG. 2, a retaining section 10D is disposed on the axially opposite side relative to the fixing section 10B. In addition, the inner diameter surface of the retaining section 10D provides a stepped mount retaining face 10D2 for an easy installation of the stationary seal ring 2. The outer diameter surface of the retaining section 10D serves as a retaining face 10D1 wherein the first hose band 8 is attached thereon.

A flexible section 10A is disposed between the fixing section 10B and the retaining section 10D. The flexible section 10A bows towards its outer diameter side, which allows the first diaphragm 10 to expand or contract in the direction of the axis.

Furthermore, a pressure receiving groove 10C is disposed in the inner diameter surface of the flexible section 10A, and the sealed process fluid acts on a first pressure receiving area 10A2 of the pressure receiving groove 10C. Pressure of the sealed process fluid exerted on the first pressure receiving area 10A2 forces the flexible section 10A to elastically expand or contract in the direction of the axis, which in turn urges the stationary seal ring 2 to move toward the rotary seal ring 12.

The fixing section 10B of the first diaphragm 10 is fixedly and sealingly fitted with the mount surface 20B by means of the engaging thread which consists of small continuous irregularities. Fastening of the first hose band 8 on the fixing surface 10B1 of the first diaphragm 10 further improves the fixation of the fixing section 10B relative to the mount surface 20B. The fixing surface 10B1 is fittingly sandwiched by a pair of bisected first covers 7, which then are secured by fastening screw bolts 36 from the both sides. The first cover 7 also hangs over the outer diameter surface of the flexible section 10A of the first diaphragm 10.

Also the retaining section 10D of the first diaphragm 10 is fixed to the retaining surface 10D1 by fastening the first hose band 8. A bisected first fastening band 3 is applied to the retaining surface 10D1 which is fixed by tightening screw bolts 36. The outer circumferential groove of each bisected first fastening band 3 integrally disposes a bisected plate 4 therein.

For joining the plate 4 and the seal cover 20, 24 pieces of spiral springs 6 are disposed in an equally spaced manner along the circumference of the seal cover 2. The number of the spiral springs 6 is determined based on the desired contact force on the seal face 2A. Guide pins 5 for the spiral springs 6 are integrally disposed in the seal cover 20. These spiral springs 6 provide a resiliently urging force to the stationary seal ring 2 via the first diaphragm 10. The resiliently urging means using the spiral springs 6 for the stationary seal ring 2 is disposed as a supplementary means according to a degree of expansion of the first diaphragm 10.

The stationary seal ring 2 is made of silicon carbide. One end of the stationary seal ring 2 serves as the seal face 2A. Also a clearance as a fluid passage 15 is disposed between the inner diameter surface 2C of the stationary seal ring 2 and the rotary shaft 50. The inner diameter surface 2C of the stationary seal ring 2 has four lines of equally spaced fixed grooves 2D therein. The number of the fixed grooves 2D is determined according to the design specifications. A joint face 2B located in the outer circumference of the stationary seal ring 2 is fittingly retained by the mount retaining surface 10D2 of the first diaphragm 10.

The engaging thread consisting of small continuous irregularities which is formed on the joint face 2B of the stationary seal ring 2 ensures a sealing fit between the joint face 2B and the mount retaining surface 10D2. In addition, a clutch ring 22 integrally constructed with the mount section 20A of the seal cover 20 disposes four clutches which are equally spaced at the circumferential end face of the clutch ring 22. These clutches engage the fixed grooves 2D of the stationary seal ring 2 for preventing the stationary seal ring 2 from rotating.

The rotary seal ring 12 disposes an opposing seal face 12A on its end face. The opposing seal face 12A forms a sealing contact relative to the seal face 2A of the stationary seal ring 2. The rotary seal ring 12 has driving grooves 12D on its inner diameter surface 12C. These driving grooves 12D are disposed at four equally spaced locations along the circumference. Also the outer diameter surface of the rotary seal ring 12 disposes a joint face 12B. This joint face 12B fits the mount retaining face 10D2 of the second diaphragm 10. Mating of the joint face 12B relative to the mount retaining face 10D2 can be achieved by preparing screw thread on the both faces. Under this circumstance, both of the mount retaining face 10D2 of the first diaphragm 10 and the joint face 2B of the stationary seal ring 2 are shaped in screw thread. That is, the mount retaining faces 10D2, 10D2 of the first diaphragm 10 and the second diaphragm 10, respectively, are shaped and dimensioned in an identical manner.

The mount fixing face 10B2 of the fixing section 10B of the second diaphragm 10 is fitted with a sleeve 11. The outer surface of the sleeve 11 should be shaped and dimensioned in an identical manner relative to the mount section 20A. That is, an engaging thread with the same irregularities as those possessed in the mount section 20A should be disposed in the mount surface 11B which is located on the outer diameter surface of the sleeve 11. Also a wall thickness of the sleeve 11 can be made thin.

The sleeve 11 may be constructed as an integral piece of the mount fixing face 10B2 of the second diaphragm 10. In this case, an further end portion located outwardly relative to the fixing section 10B of the sleeve 11 is threaded and it mates with a tapped hole which is disposed in the inner diameter surface of a first clamp ring 30.

When the second diaphragm 10 is thus arranged, in order for the first diaphragm 10 and the second diaphragm 10 to have an identical form, the mount fixing face 10B2 of the first diaphragm 10 should also deploy a sleeve of the same form which is not shown in the figure. Then a mating tapped hole with the same diameter is fabricated in the inner diameter surface of the seal cover 20 (not shown in the figure), and the seal cover 20 and the sleeve 11 are screw fastened by mating the screw thread located at the end portion of the sleeve 11 relative to the tapped hole of the seal cover 20. In this case, it is noted that the seal cover 20 has the tapped hole to mate with the sleeve 11 instead of the mount section 20A.

The sleeve 11 is thus mounted on the rotary shaft 50. However, as the diameter of the rotary shaft 50 increases, an ease of manufacturing and a reduction in the machining cost of the sleeve 11 bear a greater importance. Also a simple assembly of the sleeve 11 onto the rotary shaft 50 is another concern. For this reason, the sleeve 11 may be split into two pieces which are fitted to the rotary shaft 50 from its both sides.

The method of disposing the sleeve 11 in the fixing section 10B of the second diaphragm 10 provides a merit that the second diaphragm 10 can be disposed outside of the housing 60 instead of within the housing 60. Therefore, not only the construction of the mechanical seal device 1 is simplified, but also assembly of the mechanical seal device 1 is made easy. It also exhibits a good seal performance between the seal face 2A and opposing seal face 12A.

The sleeve 11 is typically made of stainless steel, brass, cupper and so on.

The end portion of the sleeve 11 which fits the rotary shaft 50 disposes driving pins 11A in a quadrisecting manner along the circumference. These driving pins 11A engage the driving grooves 12D of the rotary seal ring 12 in order for both to rotate together.

The other end portion of the sleeve 11 locates an O-ring slot wherein an O-ring 13 is disposed. This O-ring 13 prevents the sealed process fluid from bleeding over the inner diameter surface of the sleeve 11 and leaking to an atmospheric region.

The second diaphragm 10 to retain the rotary seal ring 12 and a couple of the second hose bands 8, 8 to fasten the both ends of the second diaphragm 10 are more or less identical in terms of the form and the mounting method to the first diaphragm 10 and the first hose bands 8, 8 for the first diaphragm 10, respectively. Also the second cover 7 has the same form as the first cover 7 and is disposed in a similar way. The second diaphragm 10 and the second cover 7 are disposed in a mirror symmetrical locations relative to the first diaphragm 10 and the first cover 7, respectively.

The second fastening band 3 wherein the plate 4 is taken out of the groove therein also is shaped and dimensioned in an identical manner relative to the first fastening band 3.

The first diaphragm 10 to the left side of FIG. 2 and the second diaphragm 10 to the right side are manufactured by a single forming die and arranged in mirror symmetrical locations. Therefore, adopting the same form for the first diaphragm 10 and the second diaphragm 10 significantly simplifies parts management after die forming. Also an accidental swapping of the first diaphragm 10 and the second diaphragm 10 does not cause a problem due to their identical form. This effectively prevents incorrect part assembly from occurring in a machine using the mechanical seal device 1.

As the first diaphragm 10 and the second diaphragm 10 have the identical form, a first pressure receiving face 10A2 and a second pressure receiving face 10A1 amount to have an equal pressure receiving area on which the sealed process fluid acts. As a result, the seal face 2A of the stationary seal ring 2 and the opposing seal face 12A of the rotary seal ring 2 are urged against one another with the same face pressure, which prevents the contact force from being dislocated. Consequently, both of the seal face 2A and the opposing seal face 12A exhibit a better seal performance and their durability is also improved.

The second diaphragm 10 has the same form as the first diaphragm 10 being disposed in a mirror symmetrical locations, as shown in FIG. 2. Therefore, the first diaphragm 10 and the second diaphragm 10 can be molded by a common forming die and arranged in symmetrical locations, which eases cost demands because two separate forming dies; one for the first diaphragm 10 and the other for the second diaphragm 10, are not needed. As the forming die is very expensive (more than 5 millions Japanese yen per piece), use of a common forming die makes a tremendous contribution to the reduction of manufacturing cost of the first diaphragm 10 and the second diaphragm 10.

Also other peripheral parts associated with the first diaphragm 10 and the second diaphragm 10, i.e., the first fastening band 3 and the second fastening band 3, the first cover 7 and the second cover 7, the first hose band 8 and the second hose band 8, can be shaped and dimensioned in an identical manner, respectively. This also significantly decreases the manufacturing cost of the parts. It further eases a burden of parts management, especially in an assembly process of the parts.

A couple of clamp rings, a first clamp ring 30 and a second clamp ring 31 which are located adjacent to the end portion of the sleeve 11 and the second diaphragm 10, are fitted relative to the rotary shaft 50. The first clamp ring 30 has a square cross section and an annular form. The first clamp ring 30 either has a slit at one place of the circumference or is bisected and is fixed to the rotary shaft 50 by tightening the fastening screw bolts 35.

If the first clamp ring 30 does not have a bisected structure, then the ring 30 is joined with the rotary shaft 50 by using an anchor bolt, not shown in the figure, whose tip is directly connected to the rotary shaft 50. The second clamp ring 31 has an identical form with the first clamp ring 30 and disposes a flange section on its outer circumference. The second clamp ring 31 is fixed relative to the rotary shaft 50 by means of the fastening screw bolts 35.

The flange section of the second clamp ring 31 disposes a plurality of bores therein which are located in an equally spaced manner along the circumference. Screw rod 32 is inserted through the bore and the tip of the screw rod 32 is fixed relative to the seal cover 20. And the mount location of the second clamp ring 31 is adjusted with a nut which engages the screw rod 32.

The first clamping ring 30 and the second clamping ring 31 enable it to dispose the second diaphragm 10 and the sleeve 11 in a desirable position.

This adjustment process is achieved by moving the second diaphragm 10 in the axial direction by means of fastening the nut located in the screw rod 32 toward the first diaphragm 10. Next, the first clamping ring 30 is fixed with the rotary shaft 60 by fastening the screw bolt 35 disposed in the first clamp ring 30 after the optimal contact state between the seal face 2A and the opposing seal face 12A is recognized. Also the second clamp ring 31 is fixed with the rotary shaft 50 by a similar method.

It is preferable that the second clamp ring 31, the screw rod 32 and the associated nut are taken off after the completion of deployment of the mechanical seal device 1.

In the mechanical seal device 1 thus constructed, there is a fluid passage 15 between the inner diameter surface of the mechanical seal device 1 and the rotary shaft 50. The fluid passage 15 is defined by the inner diameter surface 20D of the seal cover 20, the inner surface of the first diaphragm 10, the inner diameter surface 2C of the stationary seal ring 2, the inner diameter surface 12C of the stationary seal ring 12, the inner surface of the second diaphragm 10 and the outer diameter surface of the rotary shaft 50. The sealed process fluid at a high pressure flows in from the housing 60 through the fluid passage 15 and acts on the first pressure receiving face 10A2 and the second pressure receiving face 10A1 of the first diaphragm 10 and the second diaphragm 10, respectively, which are made of rubber or resin material.

The fluid pressure acting on the first pressure receiving face 10A2 of the first diaphragm 10 and the second pressure receiving face 10A1 of the second diaphragm 10 wherein both of the receiving faces have an identical form is applied to the faces of an equal pressure receiving area. Therefore, the seal face 2A of the stationary seal ring 2 supported by the first diaphragm 10 and the opposing seal face 12A of the rotary seal ring 12 supported by the second diaphragm 10 press against one another with an equal amount of urging force while maintaining a fluid tight sealing contact.

The contact between the seal face 2A of the stationary seal ring 2 and the opposing seal face 12A of the rotary seal ring 12 can be kept fluid-tight regardless of either possible bending of the rotary shaft 50 due to its large diameter and large length or the axial expansion of the shaft due to the sliding frictional heat.

Proper adjustment of the throttle valve 21 for the sealed process fluid flowing through the fluid passage 15 can achieve an optimal contact situation between the seal face 2A and the opposing seal face 12A wherein the pressure exerted on the first pressure receiving face 10A2 of the first diaphragm 10 and the second pressure receiving face 10A1 of the second diaphragm 10 is regulated.

It is noted that the stationary seal ring 2 and the rotary seal ring 12 are made of silicon carbide, carbon or ceramic material. Also the first diaphragm 10 and the second diaphragm 10 are made of rubber or resin material. Material for the first diaphragm 10 and the second diaphragm 10 is not limited to a rubber material as long as it retains rubber-like elasticity such as resin materials. Form of the first diaphragm 10 and the second diaphragm 10 should not be restricted to the aforementioned one. The first pressure receiving face 10A2 and the second pressure receiving face 10A1 of an equal pressure receiving area whose cross section is a semi-circle or U-shape can provide a similar performance when a couple of the annular bodies in the same form are arranged in symmetrical locations.

The mechanical seal device 1 of the present invention employs many common parts and the manufacturing cost of the parts can be decreased accordingly. Adopting such a construction wherein the stationary seal ring 2 and the rotary seal ring 12 are retained by the first diaphragm 10 and the second diaphragm 10, respectively, enables it to dispose the mechanical seal device 1 in the outside relative to the end portion of the housing 60. Therefore, the mechanical seal device 1 in a large size can be disposed outside of the housing 60 for sealing on the rotary shaft 50.

Different embodiments related to the present invention will be described next.

A mechanical seal device 1 as a second embodiment related to the present invention disposes a fluid passage 15 within the inner diameter surface 2C of a stationary seal ring 2 and the inner diameter surface 12C of a rotary seal ring 12 and has joint faces 2B, 12B on the individual outer diameter surfaces of the stationary seal ring 2 and the rotary seal ring 12, respectively, against which the respective retaining section 10D, 10D of a first diaphragm 10 and a second diaphragm 10 exhibit a sealing fit.

In the mechanical seal device 1 of the second embodiment, the first diaphragm 10 resiliently supports the stationary seal ring 2 while the second diaphragm 10 does the rotary seal ring 12, and the fluid passage 15 of the sealed process fluid is defined within the inner diameter surfaces 2C, 12C of the stationary seal ring 2 and the rotary seal ring 12, respectively. Under this construction, the respective pressure receiving faces 10A2, 10A1 of the first diaphragm 10 and the second diaphragm 10 receive an even pressure from the sealed process fluid, which enables it to maintain a sealing contact between a seal face 2A and an opposing seal face 12A. Also as the stationary seal ring 2 and the rotary seal ring 12 are securely fitted relative to the resiliently deformable retaining sections 10D, 10D of the first diaphragm 10 and the second diaphragm 10, respectively, the individual joint faces 2B, 12B of the stationary seal ring 2 and the rotary seal ring 12 are tightly sealed.

In a mechanical seal device 1 as a third embodiment related to the present invention, the annular body is divided in the direction of axis wherein the division faces are securely fastened as an integral construction, and the retaining section 10D of the first diaphragm 10 fitted relative to the stationary seal ring 2 and the retaining section 10D of the second diaphragm 10 fitted relative to the rotary seal ring 12 are shaped in the form of cylindrical tube.

In the mechanical seal device 1 of the third embodiment, the stationary seal ring 2 and the rotary seal ring 12 have split constructions such that the installation of the stationary seal ring 2 and the rotary seal ring 12 onto the rotary shaft 50 is simplified. As the stationary seal ring 2 and the rotary seal ring 12 are securely fitted to the resiliently deformable retaining sections 10D, 10D in a cylindrical form of the first diaphragm 10 and the second diaphragm 10, respectively, the stationary seal ring 2 and the rotary seal ring 12 can be easily assembled to the rotary shaft 50 because of the split construction. Also the semicircular, split ring segments of the stationary seal ring 2 and the rotary seal ring 12 can be easily manufactured by a compression mold forming wherein its forming die is fabricated at a low cost, which decreases a total manufacturing cost.

In a mechanical seal device 1 as a fourth embodiment related to the present invention, the throttle valve 21 is disposed in a upstream region of the fluid passage 15 of the sealed process fluid relative to the first diaphragm 10.

In the mechanical seal device 1 of the fourth embodiment, as the throttle valve 21 is located in the upstream side of the fluid passage 15 relative to the first diaphragm 10 wherein the sealed process fluid flows in, when the pressure of the fluid becomes excessively high, actions of the throttle valve 21 ensure a sealing contact between the stationary seal ring 2 and the rotary seal ring 12 both of which have bisected constructions. More specifically, the throttle valve 21 prevents the first diaphragm 10 and the second diaphragm 10 from being suffered from unwanted expansion and maintains a desired sealing contact between the seal face 2A of the stationary seal ring 2 and the opposing seal face 12A of the rotary seal ring 12 regardless of pressure fluctuations of the sealed fluid.

Disposition of the throttle valve 21 in the fluid passage 15 not only does not require a mechanical seal device 1 to be disposed within the housing 60 even in case of a high pressure sealed process fluid but also makes it possible to arrange the stationary seal ring 2 and the rotary seal ring 12 outside the housing 60 wherein the seal rings are supported by means of the first diaphragm 10 and the second diaphragm 10 alone. Also even in case of a bending situation due to a self-weight of the rotary shaft 50 of a large size or a thermal expansion of the rotary shaft 50, the use of the resiliently deformable first diaphragm 10 and the second diaphragm 10 can provide a continuous sealing contact at the seal face 2A of the stationary seal ring 2 and the opposing seal face 12A of the rotary seal ring 12.

A mechanical seal device 1 as a fifth embodiment related to the present invention retains a sleeve 11 which is fittingly inserted between the fixing section 10B of the second diaphragm 10 and the rotary shaft 50.

In the mechanical seal device 1 of the fifth embodiment, the sleeve 11 is employed which is fitted with the fixing section 10B of the second diaphragm 10 and, at the same time, is securely fixed relative to the rotary shaft 50. Therefore, the fixing section 10B of the second diaphragm 10 can be easily fixed relative to the rotary shaft 50. Also it simplifies the positioning process of the contact surface of the opposing seal face 12A of the rotary seal ring 12 relative to the seal face 2A. And it makes it easy to dispose the mechanical seal device 1 outside the housing 60. In addition, the sleeve 11 can be of a thin-wall cylindrical structure which fits the rotary shaft 50. Therefore, the sleeve 11 tends to become a light weight. This avoids undesirable eccentricity of the rotary shaft during its rotation due to the weight of the sleeve 11, which in turn prevents a wear of the opposing seal face 12A relative to the seal face 2A due to the eccentricity.

Next will be described merits of a mechanical seal device 1 related to the present invention from more technical points of view.

According to the mechanical seal device 1 of the present invention, adoption of a somewhat identical shape and dimension for the first diaphragm 10 and the second diaphragm 10 contributes the manufacturing cost reduction of the diaphragms wherein both the first diaphragm 10 and the second diaphragm 10 can be fabricated by using a single common forming die, hence a cost reduction in the forming die.

The stationary seal ring 2 and the rotary seal ring 12 are resiliently supported by the first diaphragm 10 and the second diaphragm 10, respectively. Therefore, even when the rotary shaft 50 is either subjected to a thermal expansion due to the heat given by the sealed process fluid within the housing 60 or bent by the self weight of the protruding portion of the shaft 50 which extends outward from the housing 60, the first diaphragm 10 and the second diaphragm 10 adaptively expand, according to the deformation of the rotary shaft 50, by the pressure of the sealed process fluid which acts on the first pressure receiving face 10A2 and the second pressure receiving face 10A1, respectively. As a result, the seal face 2A of the stationary seal ring 2 and the opposing seal face 12A of the rotary seal ring 12 are kept in a sealing contact. This ensures a seal performance of the mechanical seal device 1 by means of the sealing contact between the seal face 2A and the opposing seal face 12A.

The fluid pressure acting on the first pressure receiving face 10A2 of the first diaphragm 10 and the second pressure receiving face 10A1 of the second diaphragm 10 wherein both of the receiving faces have an identical form is applied to the faces of an equal pressure receiving area. Therefore, the seal face 2A of the stationary seal ring 2 and the opposing seal face 12A of the rotary seal ring 12 are urged with approximately an equal amount of force by the sealed process fluid. The same amount of urging force by which the seal face 2A of the stationary seal ring 2 and the opposing seal face 12A of the rotary seal ring 12 are urged from one another enables it to exhibit a good seal performance.

The first diaphragm 10 resiliently supports the stationary seal ring 2 while the second diaphragm 10 resiliently supports the rotary seal ring 12 wherein both rings are urged against one another to achieve a sealing contact. Such a construction makes it easy to assemble these parts in the outside of the housing 60 even if the rotary shaft 50 is large in diameter.

The split construction of the mechanical seal device 1 only requires to fit the split assemblies from the both sides. The throttle valve 21 disposed in the fluid passage 15 allows the sealed process fluid to be adjusted for regulating a pressure applied to the first diaphragm 10 and the second diaphragm 10. This not only achieves an optimal sealing contact between the seal face 2A and the opposing seal face 12A, but also prevents a friction wear between the seal face 2A and the opposing seal face 12A. Furthermore, as the fixing section 10B of the second diaphragm 10 is sealingly fixed relative to the rotary shaft 50 via the sleeve 11 which is fitted therebetween, the second diaphragm 10 can be disposed outside of the housing 60. This not only simplifies the construction of the second diaphragm 10 but also makes it easy to mount the assembly on the rotary shaft 50.

Having described specific embodiments of the invention however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A mechanical seal device for providing a seal against a sealed process fluid, said mechanical seal device comprising:
   1) a seal cover being disposed at the end face of a housing and retaining a mounting face;
   2) a first diaphragm being of an annular form and retaining a fixing section and a retaining section, said fixing section being mounted on said mounting face of said seal cover, said retaining section being located on the other side relative to said fixing section;
   3) a stationary seal ring being sealingly retained by said retaining section of said first diaphragm and having a seal face at one end;
   4) a rotary seal ring having an opposing seal face, said opposing seal face being in a sealing contact relative to said seal face of said stationary seal ring;
   5) a second diaphragm being of an annular form and being shaped and dimensioned in more or less an identical manner relative to said first diaphragm and retaining a retaining section and a fixing section, said fixing section being joined with a rotary shaft,
   6) a first pressure receiving groove defined by said fixing section and said retaining section of said first diaphragm, and a clutch ring disposed between said first diaphragm and said rotary shaft,
   7) a second pressure receiving groove defined by said fixing section and said retaining section of said second diaphragm, and a sleeve disposed between said second diaphragm and said rotary shaft, and
   8) a fluid passage guiding said sealed process fluid into said first pressure receiving groove and said second pressure receiving groove.

2. A mechanical seal device as claimed in claim 1 wherein said fluid passage communicates a passage located within the inner diameter surfaces of said stationary seal ring and said rotary seal ring.

3. A mechanical seal device as claimed in claim 1 wherein said stationary seal ring and said rotary seal ring are shaped in an annular form and divided along the axial direction, the division surfaces being fastened in an integral relation, and the retaining section of said first diaphragm to engage said stationary seal ring and the retaining section of said second diaphragm to engage said rotary seal ring are shaped in a cylindrical form.

4. A mechanical seal device as claimed in claim 1 wherein a throttle valve is disposed in a upstream side of said fluid passage relative to said first diaphragm.

5. A mechanical seal device as claimed in claim 1 wherein a sleeve is fittingly disposed between said fixing section of said second diaphragm and the rotary shaft.

6. A mechanical seal device as claimed in claim 1, wherein the first pressure groove axially expands by guiding the sealed process fluid therein, and wherein the seal face of the stationary seal ring is pressed onto the opposing seal face of the rotary seal ring.

7. A mechanical seal device as claimed in claim 1, wherein the second pressure groove axially expands by guiding the sealed process fluid therein, and wherein the opposing seal face of the rotary seal ring is pressed onto the seal face of the stationary seal ring.

8. A mechanical seal device as claimed in claim 1, wherein the sealed process fluid acts on a pressure receiving area of the first and second pressure receiving grooves, wherein the first pressure groove axially expands by guiding the sealed process fluid therein, and wherein the seal face of the stationary seal ring is pressed onto the opposing seal face of the rotary seal ring, and wherein the second pressure groove axially expands by guiding the sealed process fluid therein, and wherein the opposing seal face of the rotary seal ring is pressed onto the seal face of the stationary seal ring.

9. A mechanical seal device as claimed in claim 8, wherein the seal face of the stationary seal ring supported by the first diaphragm and the opposing seal face of the rotary seal ring supported by the second diaphragm press against each other with an equal amount of urging force while maintaining fluid tight sealing contact therebetween.

* * * * *